(12) United States Patent
Giorgini et al.

(10) Patent No.: US 9,574,576 B2
(45) Date of Patent: Feb. 21, 2017

(54) HYDRAULIC SERVO-CONTROL OF A SERVO-CONTROLLED GEARBOX

(71) Applicant: Magneti Marelli S.p.A., Corbetta (IT)

(72) Inventors: Stefano Giorgini, Minerbio (IT); Andrea Bersani, San Giovanni in Persiceto (IT); Luca Bovina, Casalecchio di Reno (IT)

(73) Assignee: Magneti Marelli S.p.A., Corbetta (IT)

( * ) Notice: Subject to any disclaimer, the term of this patent is extended or adjusted under 35 U.S.C. 154(b) by 646 days.

(21) Appl. No.: 13/773,082

(22) Filed: Feb. 21, 2013

(65) Prior Publication Data

US 2013/0213029 A1   Aug. 22, 2013

(30) Foreign Application Priority Data

Feb. 22, 2012 (IT) .............................. BO2012A0084

(51) Int. Cl.
*F15B 1/02* (2006.01)
*F15B 1/027* (2006.01)
(Continued)

(52) U.S. Cl.
CPC .............. *F15B 1/027* (2013.01); *F16H 61/30* (2013.01); *F15B 2201/205* (2013.01);
(Continued)

(58) Field of Classification Search
USPC ....................................... 60/413; 138/30, 31
See application file for complete search history.

(56) References Cited

U.S. PATENT DOCUMENTS

| 2,884,955 | A | * | 5/1959 | Yost ................................ 138/31 |
| 3,198,213 | A | * | 8/1965 | Schindel ......................... 138/31 |

(Continued)

FOREIGN PATENT DOCUMENTS

| DE | 101 43 830 A1 | 3/2003 | |
| DE | 101438830 A1 * | 3/2003 | ................ F15B 1/08 |

(Continued)

OTHER PUBLICATIONS

Device for providing hydraulic medium, (Mar. 27, 2003, [database online], [retrieved on May 18, 2015] Retrieved from the Google Patent Database using Internet <URL: https://www.google.com/patents/DE10143830A1?cl=en&dq=DE+10143830&ei=Nm1oVcWJE4aAygSLmYHABA>.*

(Continued)

*Primary Examiner* — Thomas E Lazo
(74) *Attorney, Agent, or Firm* — Howard & Howard Attorneys PLLC

(57) ABSTRACT

A hydraulic servo-control of a servo-controlled gearbox comprises hydraulic actuators defining chambers, a storing tank containing control fluid used by the actuators at room pressure, a hydraulic accumulator containing control fluid under pressure, a motor pump drawing the fluid from the tank and feeding it under pressure to the accumulator, and solenoid valves selectively connecting the chambers to the tank and accumulator. The accumulator includes an outer housing defining an inner cylindrical surface defining a first diameter, a piston arranged and axially slidable and mobile inside the housing and defining there a first variable-volume chamber for a gas and second variable-volume chamber for the fluid under pressure, and a limit stopper arranged at an open end of the housing, acting as a striker for the piston, and having an annular circlip defining an opening and (Continued)

overall second diameter approximating by excess the first diameter of the surface of the housing.

2 Claims, 4 Drawing Sheets

(51) Int. Cl.
*F16H 61/30* (2006.01)
*F16H 61/00* (2006.01)

(52) U.S. Cl.
CPC ..... *F15B 2201/312* (2013.01); *F15B 2201/60* (2013.01); *F16H 2061/0034* (2013.01); *F16H 2061/305* (2013.01)

(56) References Cited

U.S. PATENT DOCUMENTS

| | | | | |
|---|---|---|---|---|
| 3,537,357 | A | * | 11/1970 | Martin .............................. 92/90 |
| 4,041,990 | A | * | 8/1977 | Tang et al. .................... 138/31 |
| 4,651,782 | A | | 3/1987 | Fulmer |
| 5,836,207 | A | * | 11/1998 | Spooner et al. ................ 74/335 |
| 2004/0216977 | A1 | | 11/2004 | Farachi et al. |
| 2004/0238054 | A1 | | 12/2004 | Weber |
| 2006/0204389 | A1 | | 9/2006 | Weber et al. |
| 2007/0181199 | A1 | * | 8/2007 | Weber ............................ 138/31 |

FOREIGN PATENT DOCUMENTS

| | | | |
|---|---|---|---|
| JP | 8-170624 | A | 7/1996 |
| JP | 08170624 | A * | 7/1996 |
| WO | 97/05410 | A1 | 2/1997 |

OTHER PUBLICATIONS

Oct. 3, 2012 Search Report for Italian Patent App. No. BO2012A 000084.
Communication pursuant to Rule 114(2) EPC issued on Jul. 20, 2015 by the European Patent Office in related European Patent Application No. 13156461.9.
Japanese Industrial Standard JIS B 2804: 2010 (E) (JSMA/JSA), Retaining Rings (Excerpt) (15 pages).

* cited by examiner

HYDRAULIC SERVO-CONTROL OF A SERVO-CONTROLLED GEARBOX

REFERENCE TO RELATED APPLICATION

This application is based upon and claims priority to Italian Patent Application BO2012A 000084 filed on Feb. 22, 2012.

BACKGROUND OF INVENTION

1. Field of Invention

The invention relates to, in general, a hydraulic servo-control and, in particular, such a servo-control of a servo-controlled gearbox.

2. Description of Related Art

Servo-controlled gearboxes have become increasingly widespread. They are structurally similar to a traditional manual gearbox, except that the clutch pedal and the gear-changing stick operated by the driver are replaced by corresponding electric or hydraulic servo-controls.

Using a servo-controlled manual gearbox, the driver only needs to send the order to shift to a higher gear or to a lower gear to a gearbox control unit. The gearbox control unit autonomously changes gear acting on both the engine and the servo-controls associated with the clutch and gearbox.

Generally, the gearbox servo-control is of the "hydraulic" type and acts on a gearbox control shaft for transmitting both an axial displacement (i.e., along a central axis) for selecting the gear range and a rotation about the central axis for engaging and disengaging the single gears to the control shaft. Accordingly, the gearbox servo-control includes a linear hydraulic actuator mechanically coupled to the control shaft for axially displacing the control shaft and a rotary hydraulic actuator mechanically coupled to the control shaft for rotating the control shaft.

The gearbox servo-control includes further a storing tank containing the control fluid used by the hydraulic actuators (typically, oil) at room pressure, a hydraulic accumulator containing control fluid under pressure, a motor pump that draws the control fluid from the storing tank and feeds the control fluid under pressure to the hydraulic accumulator, and a number of solenoid valves that are adapted to selectively connect the chambers of the hydraulic actuators to the storing tank and to the hydraulic accumulator.

Hydraulic accumulators of the known type include an outer housing that is internally divided into a first variable-volume chamber adapted to accommodate the control fluid and a second variable-volume chamber adapted to receive a gas under pressure (typically, $N_2$).

The division between the first and second chambers is typically carried out by a partition or partitions arranged inside the outer housing and axially mobile inside the outer housing between an upper "limit stop" position and a lower "limit stop" position to vary the volumes of the first and second chambers, respectively, defined inside the outer housing. In particular, the partition(s) may include, for example, a bellows element made of a metal material, a flexible partition membrane, or even a piston.

In particular, hydraulic accumulators have become increasingly applied. They are provided with an outer housing shaped as a cup-shaped body and with a piston arranged inside the outer housing and made axially sliding and mobile inside the outer housing.

The above-described hydraulic accumulators are simple and inexpensive to be implemented. However, they have the drawback that, if traumatic and large damage occurs downstream of the hydraulic accumulator (e.g., damage of about 10 mm to piping, resulting in considerable leakage of control fluid), a depression is generated such that the partition(s) is/are removed from the dedicated seat of the outer housing and damage to the whole hydraulic servo-control is caused.

Thus, an object of the invention is to provide a hydraulic servo-control of a servo-controlled gearbox. More specifically, the object of the invention is to provide such a servo-control that overcomes the drawbacks of the related art while being simple and cost-effective to be implemented.

SUMMARY OF INVENTION

The invention overcomes the drawbacks of the related art in a hydraulic servo-control of a servo-controlled gearbox. The servo-control comprises a plurality of hydraulic actuators defining respective chambers, a storing tank containing control fluid used by the hydraulic actuators at room pressure, a hydraulic accumulator containing control fluid under pressure, a motor pump that draws the control fluid from the storing tank and feeds the control fluid under pressure to the hydraulic accumulator, and a plurality of solenoid valves that selectively connect the chambers of the hydraulic actuators to the storing tank and hydraulic accumulator. The hydraulic accumulator includes an outer housing that defines a substantially cylindrical inner surface defining a first diameter, a piston that is arranged and substantially axially slidable and mobile inside the outer housing and defines inside the outer housing a first variable-volume chamber for a gaseous material and second variable-volume chamber for the control fluid under pressure, and a limit stopper that is arranged at an open end of the outer housing, acts as a striker element for the piston, and has a substantially annular circlip defining an opening and overall second diameter that substantially approximates by excess the first diameter of the inner surface of the outer housing.

The hydraulic servo-control of a servo-controlled gearbox of the invention overcomes the drawbacks of the related art while being simple and cost-effective to be implemented.

Other objects, features, and advantages of the invention are readily appreciated as it becomes more understood while the subsequent detailed description of at least one embodiment of the invention is read taken in conjunction with the accompanying drawing thereof.

BRIEF DESCRIPTION OF EACH FIGURE OF DRAWING OF INVENTION

DETAILED DESCRIPTION OF EMBODIMENT(S) OF INVENTION

Figure 1:
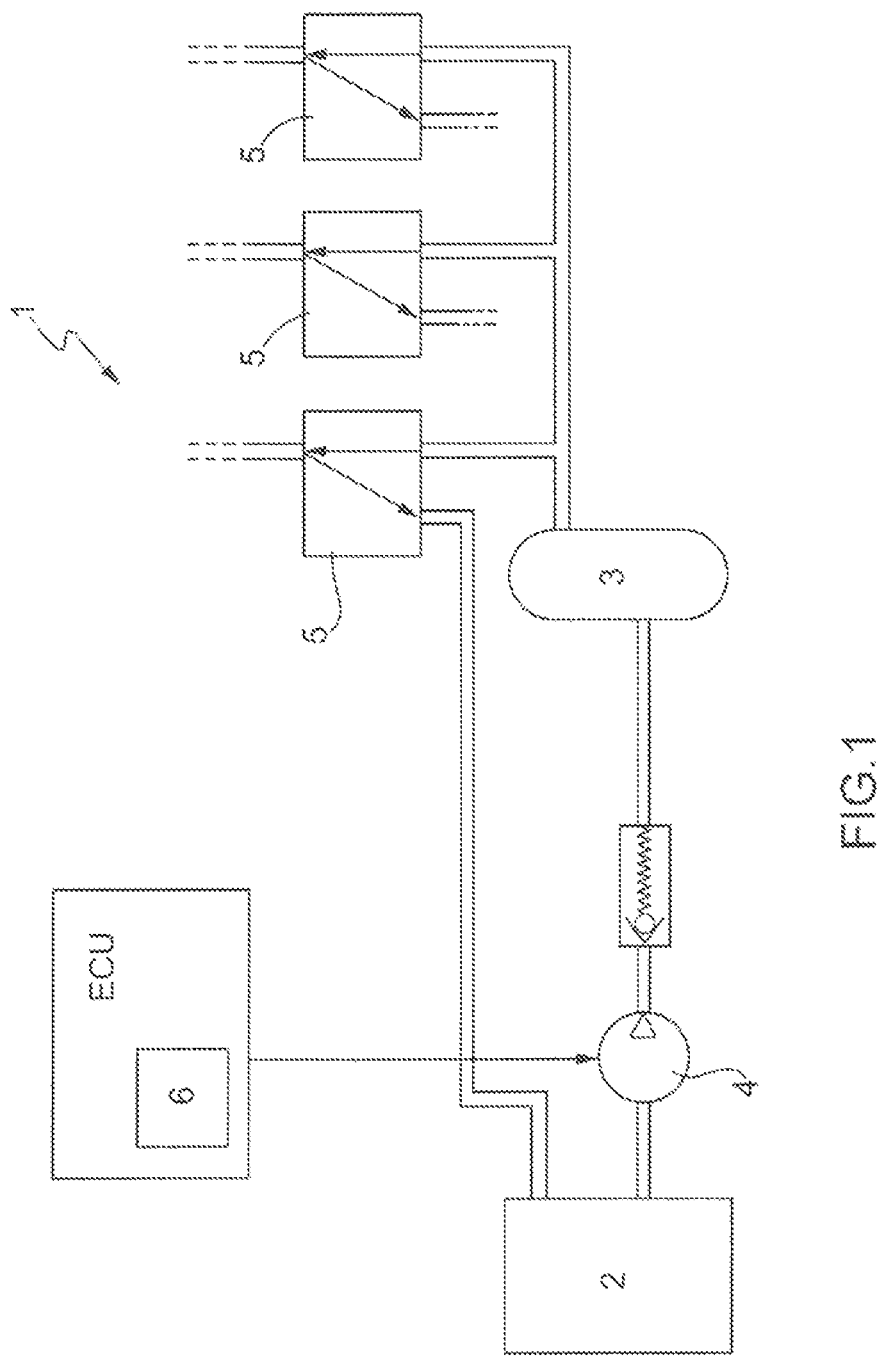
FIG. 1 shows a functional electric and hydraulic diagram of a hydraulic servo-control of a servo-controlled gearbox according to the invention.

In FIG. 1, a servo-control for a gearbox, which is provided with a control shaft (not shown), is generally indicated at 1. The servo-control 1 includes a storing tank 2 containing the control fluid (typically, oil) at room pressure and used by a plurality of hydraulic actuators (not shown) coupled to the control shaft and suited to axially displace the control shaft and to rotate the control shaft about a central axis. An electronic control unit "ECU" is suited to feedback-pilot the hydraulic actuators and transmit a linear and/or rotary motion to the control shaft as a function of the signals related to the axial and angular position of the control shaft. The signals are transmitted by a plurality of sensors facing the control shaft. A hydraulic accumulator 3 contains control fluid under pressure and a motor pump 4 that draws the control fluid from the storing tank 2 and feeds the control fluid under pressure to the hydraulic accumulator 3. A plurality of solenoid valves 5 are adapted to selectively connect the hydraulic actuators to the storing tank 2 and to the hydraulic accumulator 3.

More specifically, the hydraulic actuators are provided with a chamber (not shown) with which a respective three-way solenoid valve 5 is associated. Each three-way solenoid valve 5 is suited to selectively serve a number of functions. In particular, the solenoid valve 5 is made for keeping the respective chamber insulated to keep the control fluid present inside the chamber constant. It is made for connecting the chamber to the storing tank 2 for discharging the control fluid present inside the chamber. It is made for connecting the chamber to also the hydraulic accumulator 3 for feeding control fluid into the chamber.

To ensure correct operation of the hydraulic actuators (i.e., provision of their normal performance), the pressure value of the control fluid inside the hydraulic accumulator 3 is required to always be between a minimum value and a maximum value. Accordingly, the electronic control unit "ECU" is suited to actuate the motor pump 4 when the pressure value of the control fluid inside the storing tank 2 is lower than the minimum value and to deactivate the motor pomp 4 when the pressure value of the control fluid inside tank 2 is higher than the maximum value.

The electronic control unit "ECU" includes an assessment device 6 that is adapted to assess the pressure value of the control fluid inside the hydraulic accumulator 3 without resorting to a direct measurement of the pressure value (i.e., without using a dedicated pressure sensor). In particular, the assessment device 6 assesses the pressure value of the control fluid inside the hydraulic accumulator 3 as a function of a number of operating parameters of the motor pump 4 and of the hydraulic actuators.

Figure 2:
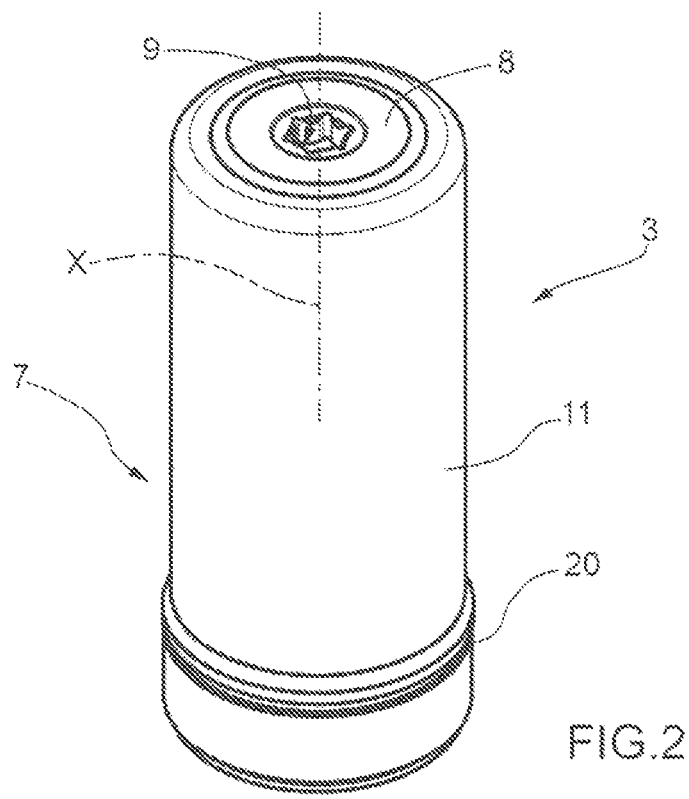
FIG. 2 shows a side elevation perspective view of a hydraulic accumulator of the servo-control illustrated in FIG. 1.
Figure 3:
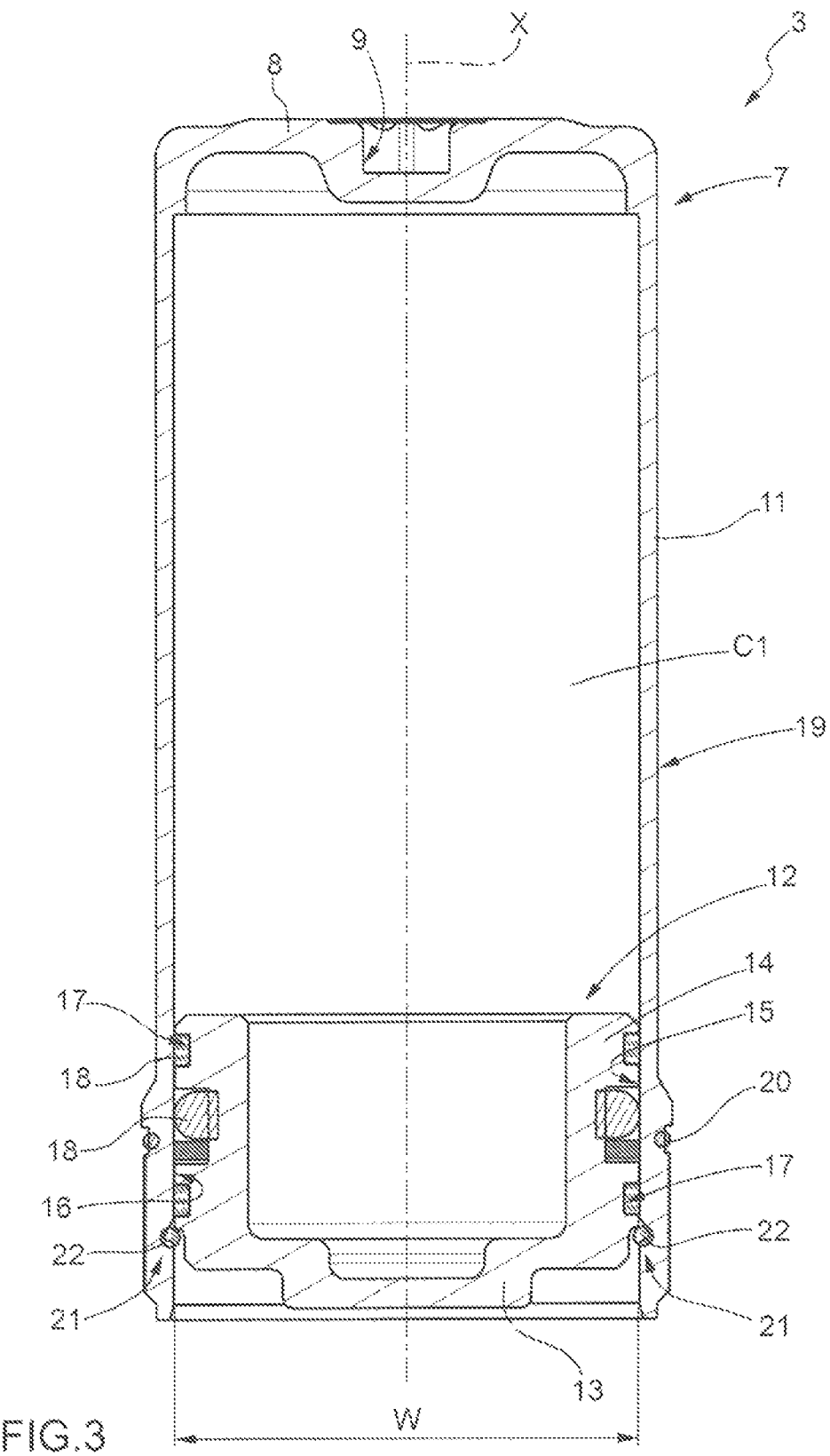
FIG. 3 shows a sectional view of an embodiment of the hydraulic accumulator of the servo-control illustrated in FIG. 2.

FIGS. 2 and 3 show a first embodiment of the hydraulic accumulator 3 in detail. The hydraulic accumulator 3 includes an outer housing 7 made of a metal material having the shape of a cup-shaped body with cylindrical symmetry and provided with an axis "X." The outer housing 7 includes an upper wall 8 provided with a central recess 9. Moreover, the outer housing 7 includes a lateral cylindrical wall 11 coaxial to the axis "X."

A piston 12 is operatively arranged inside the outer housing 7, made of a metal material, axially sliding along the axis "X," and mobile inside the outer housing 7. The piston 12 defines a variable-volume chamber "C1" inside the outer housing 7 that, in a preliminary step of assembling the hydraulic accumulator 3, is filled with a gaseous material (preferably, $N_2$). The piston 12 further defines a variable-volume chamber "C2" that is suited to be filled with the control fluid, where the two chambers "C1" and "C2" are separated by the piston 12.

The piston 12 is defined by a cylindrical-symmetry body and coaxial to the axis "X" and includes a base wall 13 and a lateral cylindrical wall 14. The lateral cylindrical wall 14 is provided with an outer cylindrical surface 15 coaxial to the axis "X" and the diameter of which approximates by defect the diameter "W" of an cylindrical inner surface 16 coaxial to the axis "X" of the outer housing 7.

A plurality of seats 17 are on the outer surface 15 of the piston 12, adapted to accommodate a plurality of annular-shaped gasket elements 18, coaxial to the axis "X, made of a plastic material, and suited to allow the sliding of piston 12 inside the outer housing 7 to be improved and the control-fluid leaks to be prevented.

According to an embodiment, a pilot cut is on an outer cylindrical surface 19 of the outer housing 7 for accommodating a sealing ring 20, coaxial to the axis "X," and made of a plastic material. The sealing ring 20 is arranged close to the open end of the outer housing 7.

As mentioned above, the piston 12 is made axially sliding along the axis "X" and mobile inside the outer housing 7 between an upper "limit stop" position determined by the upper wall 8 of the outer housing 7 and a lower "limit stop" position.

The lower "limit stop" position is defined by the presence of the limit stopper 21. The limit stopper 21, in turn, includes a circlip 22 (also known as a "C-clip") having a substantially annular shape and being coaxial to the axis "X" and, in an embodiment, made of elastic steel. The circlip 22 is operatively arranged inside a dedicated seat in the inner surface 16 of the outer housing 7. The circlip 22 projects toward the inside of the outer housing 7 to act as a striker element for the piston 12 that slides therein.

Figures 4A, 4B:
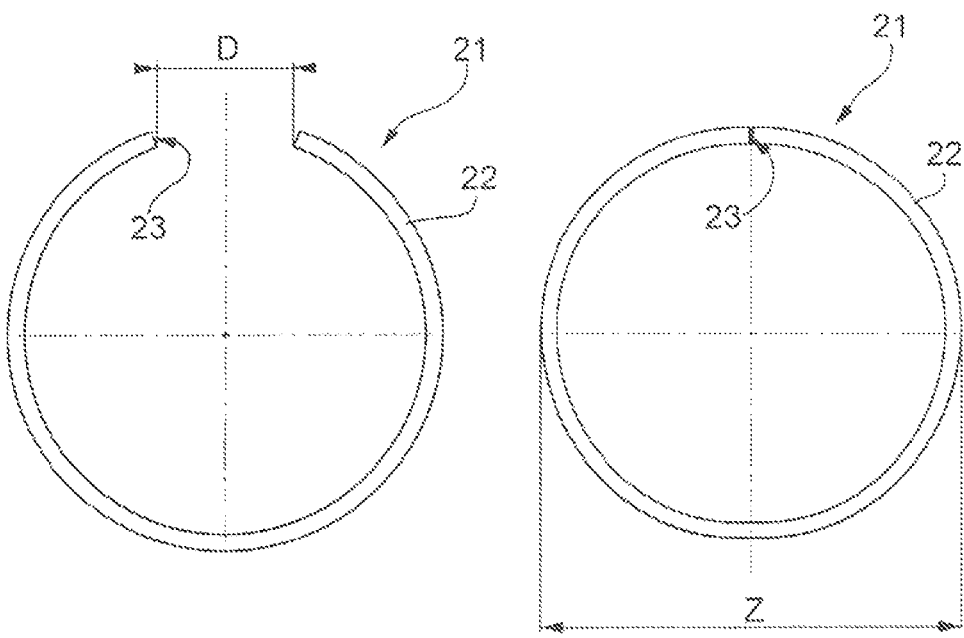
FIGS. 4a and 4b show plan views of a detail of the hydraulic accumulator of the servo-control illustrated in FIG. 2.

As better shown in FIGS. 4a and 4b, the circlip 22 does not define a complete circumference, but has an opening 23 that is made for optimizing the process of assembling the hydraulic accumulator 3.

According to an embodiment, when the circlip 22 is in an "operating" condition (i.e., when the circlip 22 is inserted into the dedicated seat in the inner surface 16 of the outer housing 7), the opening 23 of the circlip 22 has a size "D" smaller than 1 mm (in an embodiment, ranging from 0.6 mm to 1 mm). The "operating" condition is shown in FIG. 4a.

In the condition shown in FIG. 4b, the ends of the circlip 22, which define opening 23, are arranged in contact with each other. In this condition, the circlip 22 has an overall diameter "Z" that substantially approximates by excess the diameter "W" of the inner surface 16 of the outer housing 7. In other words, when the circlip 22 is arranged with the ends defining the opening 23 in contact with each other, the overall diameter "Z" is larger than the diameter "W" of the inner surface 16 of the outer housing 7.

Such a condition is even more so verified in operation (i.e., when the circlip 22 is inserted into the dedicated seat in the inner surface 16 of the outer housing 7). In other words, even in the "operating" condition shown in FIG. 4a, the circlip 22 has an overall diameter "Z" that substantially approximates by excess the diameter "W" of the inner surface 16 of the outer housing 7. Even when the circlip 22 is inserted into the dedicated seat in the inner surface 16 of the outer housing 7, the overall diameter "Z" is larger than the diameter "W" of the inner surface 16 of the outer housing 7.

The step of assembling the hydraulic accumulator 3 takes place in an environment at a pressure of about 30 bar in which the chamber "C1" is filled with a gaseous material (in an embodiment, $N_2$) and the piston 12 is inserted into the outer housing 7. Once the piston 12 has been inserted, the circlip 22 is also fitted into its dedicated seat. Since the opening 23 of the circlip 22, in operation (i.e., in the "operating" condition in which the circlip 22 has been inserted into the dedicated seat in the outer housing 7), has its ends at a short distance from each other, the two ends of the circlip 22 must be diverted by slightly deforming it to allow the "assembly" operation.

In a totally similar manner, causing the overall diameter "Z" of the circlip 22, in operation, to substantially approximate by excess the diameter "W" of the inner surface 16 of the outer housing 7, it is not possible to remove the circlip 22 from its seat in the inner surface 16 of the outer housing 7. Therefore, even in the unfortunate case of occurrence of traumatic and large damage of the conduits located downstream of the hydraulic accumulator 3 and considerable depression, the travel of the piston 12 is, however, stopped by the presence of the circlip 22.

Figure 5:
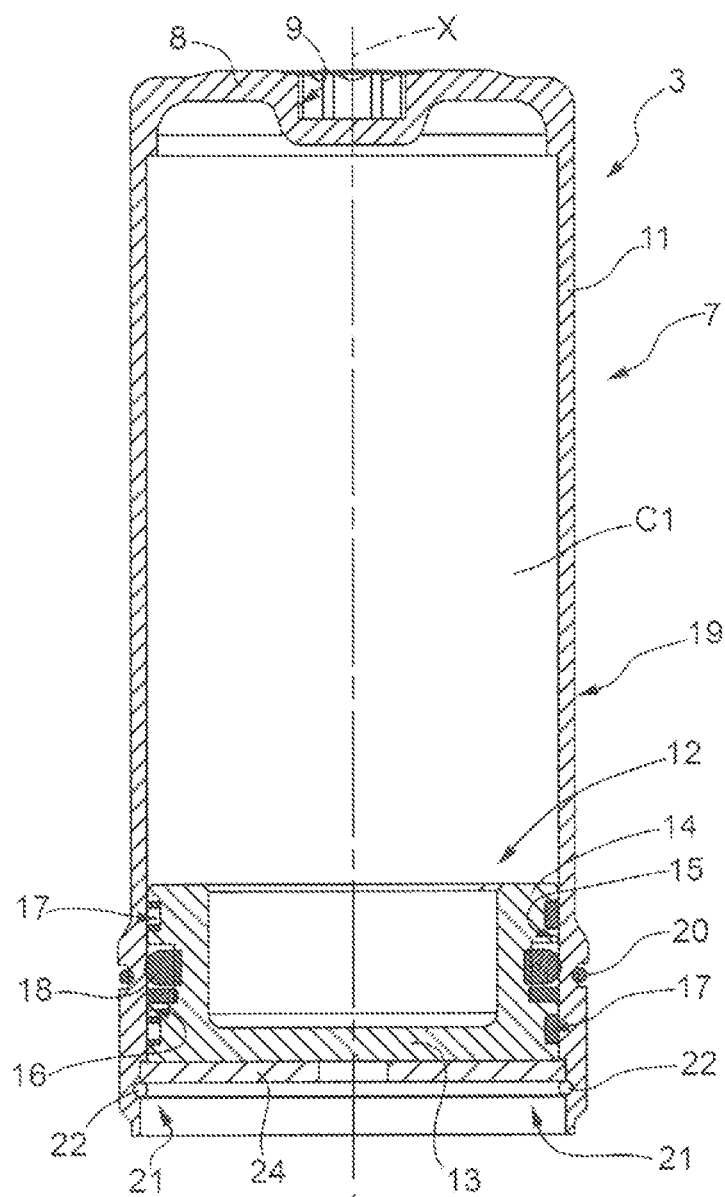
FIG. 5 shows a sectional view of another embodiment of a hydraulic accumulator of the servo-control illustrated in FIG. 1.
Figure 6:
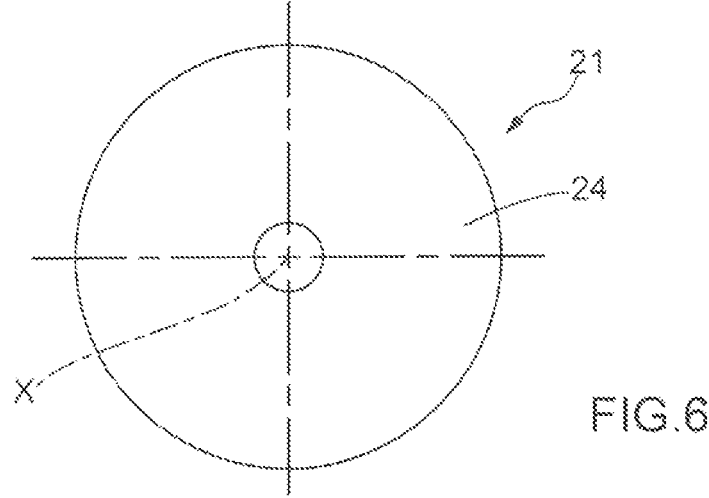
FIG. 6 shows a plan view of a detail of the hydraulic accumulator of the servo-control illustrated in FIG. 5.

The hydraulic accumulator 3 shown in FIG. 3 is similar to that shown in FIGS. 5 and 6, and the corresponding parts thereof are indicated, where possible, with the same reference numerals.

In particular, according to the embodiment shown in FIG. 5, the limit stopper 21 also includes a perforated plate 24 that is operatively interposed between the annular circlip 22 and piston 12. As better shown in FIG. 6, the perforated plate 24 has a discoid shape with a reduced thickness, is coaxial to the axis "X," and has a diameter substantially approximating by defect the diameter "W" of the inner surface 16 of the outer housing 7. The perforated plate 24 has a plurality of through-holes or openings that define a hydraulic narrowing for the control fluid in case of possible and undesired damage to the conduits downstream of the hydraulic accumulator 3. The perforated plate 24 is not provided with sealing elements and/or gaskets.

According to an embodiment, the perforated plate 24 has a single through-opening coaxial to the axis "X" and having such a size as to define a hydraulic narrowing for the control fluid in case of possible and undesired damage to the conduits downstream of the hydraulic accumulator 3.

According to this embodiment, the opening 23 of the circlip 22 (made for optimizing the process of assembling the hydraulic accumulator 3) may have a size smaller than or equal to 20 mm (in an embodiment, ranging from 14 mm to 20 mm).

Also in this case, the step of assembling the hydraulic accumulator 3 takes place in an environment at a pressure of about 30 bar in which the chamber "C1" is filled with a gaseous material (in an embodiment, $N_2$), and the piston 12 is inserted into the outer housing 7. Once the piston 12 has been inserted, the perforated plate 24 and circlip 22 are also fitted into the dedicated seat thereof. According to this embodiment, since the opening 23 of the circlip 22 has a size smaller than or equal to 20 mm (in an embodiment, ranging from 16 mm to 20 mm), diverting the circlip 22 (by slightly deforming it before its insertion into the seat) is not required.

According to an embodiment (not shown), the limit stopper 21 includes the perforated plate 24, which is operatively interposed between the circlip 22 and piston 12. To further improve the reliability of the hydraulic accumulator 3, the opening 23 of the circlip 22 [made for optimizing the process of assembling the hydraulic accumulator 3 in operation (i.e., once the circlip 22 has been inserted into the seat within the outer housing 7)] has a size smaller than or equal to 10 mm.

Also in this case, the step of assembling the hydraulic accumulator 3 takes place in an environment at a pressure of about 30 bar in which the chamber is filled with a gaseous material (in an embodiment, $N_2$), and the piston 12 is inserted into the outer housing 7. Once the piston 12 has been inserted, the perforated plate 24 and circlip 22 are also fitted. Since the opening 23 of the circlip 22, in operation (i.e., once the circlip 22 has been inserted into the seat in the outer housing 7), has a size smaller than or equal to 10 mm, the two ends of the circlip 22 need to be diverted by slightly deforming them to insert them into their respective seats.

Due to the presence of the perforated plate 24 and/or size of the opening 23 in the circlip 22, if traumatic and large damage occurs in the conduits downstream of the hydraulic accumulator 3 (e.g., damage of about 10 mm to piping that results in considerable leakage of the control fluid) and a considerable depression is, thus, generated, the travel of the piston 12 is, however, stopped by the presence of the limit stopper 21.

With an opening 23 in the circlip 22 that, in operation (i.e., once the circlip 22 has been inserted into the seat in the outer housing 7), has a size smaller than or equal to 10 mm and/or the presence of the perforated plate 24, the limit stopper 21 cannot be removed from the respective seat.

Therefore, damage to the whole hydraulic servo-control 1 can be avoided, and the servo-control 1 is simultaneously cost-effective, easy to be implemented, and reliable.

It should be appreciated by those having ordinary skill in the related art that the invention has been described above in an illustrative manner. It should be so appreciated also that the terminology that has been used above is intended to be in the nature of words of description rather than of limitation. It should be so appreciated also that many modifications and variations of the invention are possible in light of the above teachings. It should be so appreciated also that, within the scope of the appended claims, the invention may be practiced other than as specifically described above.

What is claimed is:

1. A hydraulic servo-control of a servo-controlled gearbox, the servo-control comprising:
    a plurality of hydraulic actuators defining respective chambers;
    a storing tank containing control fluid used by the hydraulic actuators;
    a hydraulic accumulator containing control fluid under pressure and comprising an outer housing having a cup-shaped body with cylindrical symmetry, such that it defines an axis (X) and an upper wall, a lateral cylindrical wall coaxial to the axis (X) and an inner cylindrical surface having a first diameter (W); and a piston having a lateral cylindrical wall and a base wall with a diameter less than that of said lateral cylindrical wall, which is arranged inside the outer housing, and which is axially sliding and mobile inside the outer housing itself, and suited to define, inside the outer housing, a first variable-volume chamber (C1) for a gaseous material and a second variable-volume chamber (C2) for the control fluid under pressure and a limit stop, which is arranged at an open end of the outer housing, and acts as a striker element for the piston; wherein the outer overall diameter of the piston approximates the first diameter (W) of the inner cylindrical surface of the outer housing;
    a motor pump that draws the control fluid from the storing tank and feeds the control fluid under pressure to the hydraulic accumulator;

a plurality of solenoid valves that selectively connect the chambers of the hydraulic actuators to the storing tank and hydraulic accumulator;

said limit stop having a annular circlip defining an opening and overall second diameter (Z) that approximates the first diameter (W) of the inner surface of the outer housing; wherein, in the condition in which the ends of the circlip defining the opening are arranged in contact with each other, the second overall diameter (Z) approximates the first diameter (W) of the inner cylindrical surface of the outer housing, wherein a stop limit is adapted to engage the circlip and wherein the circlip is housed in a seat of the inner cylindrical surface of the outer housing spaced longitudinally from the base wall of the piston so as to project toward the inside of the outer housing.

2. The servo-control as set forth in claim 1, wherein a size of the opening of the circlip is no greater than about 1 mm.

\* \* \* \* \*